United States Patent [19]

Harris et al.

[11] Patent Number: 4,787,528

[45] Date of Patent: Nov. 29, 1988

[54] TIP-PROOF CAR AND FILLER NECK

[75] Inventors: Robert S. Harris; Billy G. Crute, both of Connersville, Ind.

[73] Assignee: Stant Inc., Connersville, Ind.

[21] Appl. No.: 720,979

[22] Filed: Apr. 8, 1985

[51] Int. Cl.$^4$ .............................................. B65D 41/04
[52] U.S. Cl. .................................. 220/86 R; 220/288; 220/304; 220/DIG. 33
[58] Field of Search .............. 220/86 R, 85 F, 85 VS, 220/85 VR, 203, 288, 303, 304, DIG. 32, DIG. 33

[56] References Cited

U.S. PATENT DOCUMENTS

| | | | |
|---|---|---|---|
| 1,754,776 | 4/1930 | Stanley | 220/304 X |
| 2,675,142 | 4/1954 | Spayd | 220/304 |
| 2,893,590 | 7/1959 | Buckley | 220/304 |
| 3,912,117 | 10/1975 | Ryding | 220/303 X |
| 4,099,645 | 7/1978 | Muth et al. | 220/304 |
| 4,114,779 | 9/1978 | Stoll, III | 220/288 |
| 4,142,756 | 3/1979 | Henning et al. | 220/86 R X |
| 4,228,915 | 10/1980 | Hooper et al. | 220/288 |
| 4,231,240 | 11/1980 | Fujita et al. | 220/288 X |

*Primary Examiner*—Steven M. Pollard
*Attorney, Agent, or Firm*—Barnes & Thornburg

[57] ABSTRACT

A filler neck is provided for receiving a filler cap including a closure member having an axially outer portion, a threaded axially middle portion, and an axially inner portion. The filler neck includes a generally cylindrical tube having an axially outer portion, a threaded axially middle portion for receiving the threaded axially middle portion of the closure member, and a reduced-diameter axially inner portion. The reduced-diameter axially inner portion is positioned for receiving the axially inner portion of the closure member in a closely spaced relation to prevent radial movement of the axially inner portion of the closure member.

9 Claims, 1 Drawing Sheet

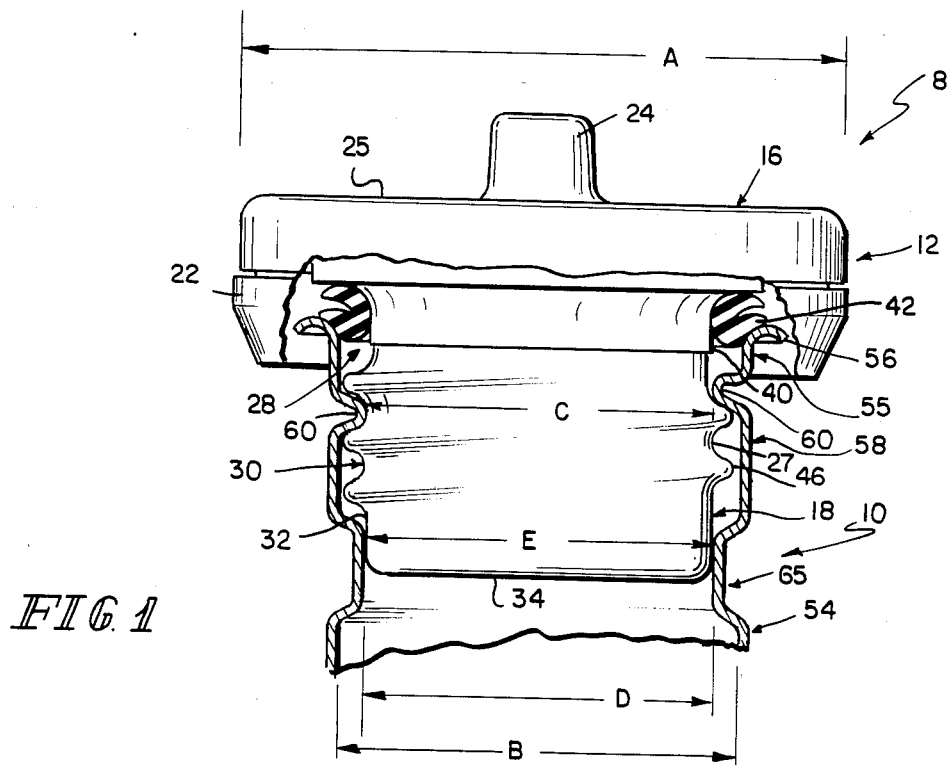

TIP-PROOF CAR AND FILLER NECK

This invention relates to vehicle fuel tank filler necks, and more particularly to filler necks for receiving threaded closure caps.

Threaded vehicle fuel tank filler necks for receiving threaded closure caps are known and are currently in widespread use in the automotive industry. Some examples of threaded closure caps and filler necks are shown in Sloan, Sr. U.S. Pat. No. 4,091,955; Sloan Jr. U.S. Pat. Nos. 4,102,472; 4,083,209; and 4,072,245 and Evans U.S. Pat. No. 4,342,208.

A known threaded closure cap is shown in Sloan, Sr. U.S. Pat. No. 4,091,955, as including a shell portion which is disposed outside the filler neck and a closure member which extends at least partially into the filler neck. The closure member includes a generally cylindrically shaped portion for insertion into the fuel tank filler neck. A thread is formed on the radially outer surface of the cylindrical portion for engaging the threaded radially inner surface of the filler neck. The cap may also include various vent valve structures for regulating pressure inside the vehicle fuel tank.

A known vehicle fuel tank filler neck structure is shown in Sloan, Jr. U.S. Pat. No. 4,102,472. Known filler necks generally comprise a constant diameter tubular members having a radially inwardly extending thread rolled therein. The thread of the filler neck is sized and positioned to engage the thread formed on the radially outer surface of the closure portion of the filler cap. A radially outwardly extending lip is usually provided at the axially outer end of the filler neck.

It is one object of the present invention to provide an improved filler neck structure for receiving threaded filler caps.

In accordance with the present invention, a filler neck is provided for receiving a filler cap including a closure member having an axially outer portion, a threaded axially middle portion, and an axially inner portion. The filler neck comprises a generally cylindrical tube having an axially outer portion, a threaded axially middle portion for receiving the threaded axially middle portion of the closure member, and a reduced-diameter axially inner portion. The reduced-diameter axially inner portion is positioned for receiving the axially inner portion of the closure member in a closely spaced relation to prevent radial movement of the axially inner portion of the closure member.

One feature of the present invention is that a filler neck is provided having a reduced-diameter axially inner portion for receiving the axially inner portion of the closure member in a closely spaced relation. This feature has the advantage of preventing radial movement of the closure cap in the filler neck. The reduced-diameter portion cooperates with the thread and lip of the filler neck to provide three seating points between the filler neck and cap. These seating points reduce the likelihood that the cap will become misaligned in the neck. The three seating points help to produce a fluid and vapor-tight seal between the cap and filler neck.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures, in which:

FIG. 1 is a sectional view of a vehicle fuel cap engaging a vehicle fuel filler neck of the present invention; and FIG. 2 is a sectional view of a vehicle fuel cap engaging an alternate embodiment vehicle fuel filler neck of the present invention.

A filler cap and neck assembly 8 for a vehicle fuel tank (not shown) is shown in FIG. 1 as including a filler neck 10 into which vehicle fuel can be introduced and a filler cap 12 for closing the open end of the filler neck 10. Filler cap 12 includes a generally disk-shaped shell portion 16 which is provided for covering the opening in the filler neck 10 and a closure member 18 which is insertable into the opening in the filler neck 10 for engaging the filler cap 12 to the filler neck 10, and for sealing the opening in the filler neck 10. The shell portion 16 includes a skirt 22 which extends radially outward beyond the outer periphery of the filler neck 10. The skirt 22 has a diameter A which is greater than the diameter of the filler neck 10 to prevent the shell portion 16 from being inserted into the filler neck 10. A knob 24 or other handle is formed on the axially outwardly facing surface 25 of the shell portion 16 for permitting a user to grasp the shell portion 16 to rotate the cap 12 into and out of engagement with the filler neck 10.

The closure member 18 of the cap 12 is generally cylindrical and includes a radially outwardly facing surface 27 having an axially outer portion 28, an axially middle portion 30, and an axially inner or pilot portion 32. The axially inner end of the axially inner portion 32 terminates at an axially inwardly facing surface 34. The axially outer portion 28 includes a means (not shown) for engaging the shell portion 16. One type of engagement means is shown in Sloan, Sr. U.S. Pat. No. 4,091,955. A groove 40 is provided on the axially outer portion 28 of radially outwardly facing surface 27. The groove 40 provides a seat for a split O-ring 42.

The axially middle portion 30 of radially outwardly facing surface 27 includes a radially outwardly extending spiraling thread 46, which is formed thereon. The axially inner portion 32 of the radially outwardly facing surface 27 is generally cylindrical and has an outer radial diameter E.

Filler neck 10 comprises a generally cylindrical tube 54 having a generally constant diameter B throughout its length, except for portions of the filler neck 10 which are in axial alignment with the filler cap 12 when the filler cap 12 is engaged with the neck 10. The filler neck 10 includes an axially outer portion 55 having a radially outwardly extending lip such as end flange 56. The axially outer surface of end flange 56 provides a first seating point upon which O-ring 42 seats. The axially middle portion 58 includes a radially inwardly extending spiraling thread 60 which is sized and positioned for receiving the spiraling thread 46 of the radially outer surface 27 of the axially middle portion 30 of a closure 18. The engagement between the threads, 46, 60 of the cap 12 and filler neck 10 comprises the second seating point between the cap 12 and filler neck 10.

The spiraling thread 60 is preferably rolled into the filler neck 10 and has a radial diameter C (between opposed peaks) which is sized to receive the thread 46 of cap 12 relatively loosely. A relatively loose fit between thread 46 and thread 60 is preferable to minimize the friction between the threads 46, 60. The friction is minimized between the threads 46, 60, to prevent a gas station attendant or vehicle owner from incompletely installing the cap 12 into the neck 10. A large amount of friction between the neck 10 and cap 12 might prevent the user from fully engaging the thread 46 of the cap 12 onto the thread 60 of the neck 10. The diameter C between opposed peaks of thread 60 should also be large enough to enable the axially inner portion 32 of the cap 12 to pass inwardly past the thread 60 unimpeded. Therefore, diameter C should be greater than diameter E, the diameter of the axially inner portion of the cap 12.

The axially inner portion 65 of the neck 10 has a reduced radial diameter D which is sized for receiving the axially inner portion 32 of the radially outer surface 27 of the cap 12 in a closely spaced relation. The diameter D of the axially inner portion 65 is preferably great enough to receive the axially inner portion 32 without causing any substantial friction between the respective axially inner portions 32, 65, but to be small enough to prevent any substantial radial movement of the axially inner portion 32 of the cap 12 in the axially inner portion 65 of the filler neck 10. The diameter D of the axially inner portion 65 of filler neck 10 approximates, but is slightly greater than the diameter E of the axially inner portion 32 of cap 12.

For example, it has been found by applicants that the clearance between the axially inner portions 32, 65 of the cap 12 and filler neck 10, respectively, should be between approximately 0.002 inches (0.051 mm) and 0.014 inches (0.36 mm) and preferably 0.010 inches (0.254 mm). Thus, for example if the outer diameter E of the axially inner portion 32 of the cap 12 is 1.555 inches (39.5 mm), the inner diameter D of the axially inner portion 65 of the filler neck 10 should be a maximum of 1.569 inches (39.9 mm) and preferably 1.565 inches (39.75 mm). Care should be taken to ensure that the clearance between the axially inner portions 32,65 not be too large. If the clearance between the axially inner portions is too large, the axially inner portion 65 of the neck may not prevent sufficiently the radial movement of the axially inner portion 32 of cap 12.

The closely spaced relation between the axially inner portions 32, 65 of the cap 12 and neck 10, respectively, comprises a third seating point for the cap. The reduced-diameter axially inner portion 65 is preferably formed in much the same manner as thread 60, that is, by rolling the reduced diameter axially inner portion 65 into the filler neck 10.

The axially inner portions 32,65 of the cap 12 and filler neck 10, respectively are axially positioned relative to each other 32,65 to provide at least about a ⅛" (3.175 mm) axial overlap between the axially inner portions 32,65. A cap 12 used with the filler neck 10 of the present invention preferably includes an axially inner portion having an axial length of 0.175 inches (4.45 mm) between the axially inwardmost portion of thread 46 and the axially inner end of the cap 12.

The three seating point arrangement of the present invention helps to maintain a secure seal between the cap 12 and neck 10 in the event that a radially directed force is exerted against the shell 16 of the cap 12. When the cap 12 is properly seated in the filler neck 10, the engagement of the O-ring 42 and lip 56 provide a fluid and vapor-tight seal for the opening of the filler neck 10. The closely spaced relation between the axially inner portions 32,65 of the cap 12 and neck 10, respectively, helps to prevent radially directed forces, which are exerted against the shell 16 of the cap 12, from causing radial movement of the axially inner portion 32 of the cap 12. In the absence of the closely spaced relation between the axially inner portions 32,65 of the filler cap 12 and filler neck 10, these radially directed forces could cause the cap 12 to become tilted in the neck 10. This tilting could cause one portion of the O-ring 42 to be relatively more compressed and a diametrically opposed portion of the ring 42 to become relatively less compressed. If the radially directed force exerted on the shell 16 were great enough, this tilting could be sufficient to permit vapor or liquid to escape past the less compressed portion of the O-ring 42 and out of the filler neck 10. By preventing radial movement of the axially inner portion 32 of the cap 12, the reduced-diameter portion 65 of the filler neck 10 helps to maintain a relatively constant pressure along all points of engagement between the O-ring 42 and end flange 56.

A second embodiment of the present invention is shown in FIG. 2 as including a filler cap 12 which is generally similar to filler cap 12, shown in FIG. 1. Filler cap 12 is received in a generally cylindrical tubular filler neck 75 which has a axially outer portion 55 and a threaded axially middle portion 58 generally identical to the axially outer and axially middle portions 55, 58 of filler neck 10 shown in FIG. 1. Filler neck 75, however, has an axially inner portion 78 which does not have a reduced diameter. Rather, the diameter H of the axially inner portion 78 is generally constant throughout the length of the tube 75, except for the radially inwardly rolled threads 60 and the radially outwardly disposed flange 56.

A hardened plastic annular ring 86 is inserted into the axially inner portion 78 of the filler neck 75 to provide a reduced diameter axially inner portion. The annular ring 86 is provided for receiving the axially inner pilot portion 32 of cap 12 in a closely spaced relation to prevent radial movement of the cap 12 in the filler neck 75. Annular ring 86 performs the same function as reduced-diameter, axially inner portion 65 of filler neck 10, shown in FIG. 1.

The annular ring 86 includes an annular outer surface 90 having a diameter K which is sized to be received snugly by, and engage the interior wall 92 of the filler neck tube 75. A chemical or mechanical fastening means can be provided for securing the ring 86 to the interior wall 92. The annular ring 86 also includes an annular inner surface 94 having a diameter J which is slightly greater than the outer diameter E of the axially inner portion 32 of cap 12. The general relationship between the sizes of the diameters E, J of the cap 12 and annular ring 86, respectively, is generally similar to the relationship between the diameters D, E of the axially inner portion 65 of filler neck 10, and the outer diameter of the axially inner portion 32 of cap 12, shown in FIG. 1.

Although the invention has been described in detail with reference to certain preferred embodiments and specific examples, variations and modifications exist within the scope and spirit of the invention as described and as defined in the following claims.

What is claimed is:

1. A vehicle fuel tank filler neck for receiving a rigid threaded vehicle fuel tank filler cap including a closure member having an axially outer portion, a threaded axially middle portion, and an axially inner portion, the filler neck comprising a generally cylindrical tube having an axially outer portion, a threaded axially middle portion for receiving the threaded axially middle portion of the closure member, the threaded middle portion being sized to receive the closure member relatively loosely so as to permit a skewed engagement with the closure member, and a reduced diameter axially inner portion sized and positioned to receive the rigid axially inner portion of the closure member in a closely spaced relation as the filler cap is engaged with the filler neck to prevent a skewed orientation of the closure member, thereby ensuring a total circumferential sealing relation at the inner filler neck and closure member portions.

2. The invention of claim 1 wherein the axially inner portion of the filler neck comprises an annular ring positioned in the filler neck.

3. The invention of claim 1 wherein the axially inner portion of the neck comprises a radially inwardly rolled portion of the filler neck.

4. A vehicle fuel tank filler neck for receiving a threaded rigid vehicle fuel tank filler cap including a closure member having an axially outer surface, a threaded axially middle surface, and an axially inner surface, the filler neck comprising a generally cylindrical tube having an axial outer surface coaxial with the axially outer surface of the closure member, a threaded axially middle surface coaxial with the threaded axially middle surface of the closure member, the threaded middle surface being sized to receive the closure member relatively loosely so as to permit a skewed engagement with the closure member, and an axially inner surface parallel to the axis of the rigid axially inner surface of the closure member, the inner closure member and filler neck surfaces being positioned in a closely spaced relation when the closure member is inserted into the filler neck, whereby the rigid outer, middle, and inner surfaces cooperate to prevent misalignment of the filler cap in the tube.

5. The invention of claim 4 wherein the axially inner surface of the filler neck comprises an annular ring having an annular outer surface for engaging the cylindrical tube and an annular inner surface for concentrically receiving the axially inner surface of the closure member in a closely spaced relation.

6. The invention of claim 4 wherein the axially inner surface of the filler neck comprises a generally cylindrical reduced-diameter surface formed as a part of the cylindrical tube.

7. The invention of claim 6 wherein the generally cylindrical reduced diameter surface is formed by a rolling operation.

8. In combination, a vehicle fuel tank filler neck, having a loosely threaded middle portion, and a loosely threaded rigid vehicle fuel tank filler cap, the filler neck being formed with a reduced diameter portion disposed axially inwardly from the threads when the filler cap is engaged with the filler neck, the filler cap being formed with a rigid pilot portion for engaging the reduced diameter portion to stabilize the filler cap in the filler neck.

9. In a vehicle fuel tank filler neck for receiving a rigid vehicle fuel tank filler cap including a closure member having an axially outer portion, a threaded axially middle portion and an axially inner portion, said filler neck comprising a generally cylindrical tube having an axially outer portion, a threaded axially outer portions and threaded axially middle portions each respectively sized to provide a relatively loose connection when the filler cap is engaged with the filler neck, the improvement comprising a reduced-diameter axially inner portion, sized and positioned to receive coaxially, in a closely spaced relation, the rigid axially inner portion of the closure member when the filler cap is engaged with the filler neck.

* * * * *